(12) United States Patent
Jiang et al.

(10) Patent No.: US 12,282,654 B2
(45) Date of Patent: Apr. 22, 2025

(54) EFFECTIVE TRANSACTION TABLE WITH PAGE BITMAP

(71) Applicant: Samsung Electronics Co., Ltd., Suwon-si (KR)

(72) Inventors: Dongyan Jiang, San Jose, CA (US); Hongzhong Zheng, Los Gatos, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 17/480,061

(22) Filed: Sep. 20, 2021

(65) Prior Publication Data

US 2022/0004321 A1 Jan. 6, 2022

Related U.S. Application Data

(63) Continuation of application No. 16/735,688, filed on Jan. 6, 2020, now Pat. No. 11,126,354, which is a
(Continued)

(51) Int. Cl.
*G06F 3/06* (2006.01)
*G06F 9/46* (2006.01)
(Continued)

(52) U.S. Cl.
CPC .......... *G06F 3/0608* (2013.01); *G06F 3/0641* (2013.01); *G06F 3/068* (2013.01);
(Continued)

(58) Field of Classification Search
None
See application file for complete search history.

(56) References Cited

U.S. PATENT DOCUMENTS

| 6,438,560 B1 | 8/2002 | Loen |
| 7,650,460 B2 | 1/2010 | Cheriton |

(Continued)

FOREIGN PATENT DOCUMENTS

| CN | 102498477 A | 6/2012 |
| CN | 102866957 A | 1/2013 |

(Continued)

OTHER PUBLICATIONS

Cheriton et al., "HICAMP: Architectural Support for Efficient Concurrency-safe Shared Structured Data Access," ASPLOS '12, Mar. 3-7, 2012, pp. 287-299.
(Continued)

*Primary Examiner* — Michael Alsip
(74) *Attorney, Agent, or Firm* — Renaissance IP Law Group LLP

(57) ABSTRACT

A transaction manager for use with memory is described. The transaction manager can include a write data buffer to store outstanding write requests, a read data multiplexer to select between data read from the memory and the write data buffer, a command queue and a priority queue to store requests for the memory, and a transaction table to track outstanding write requests, each write request associated with a state that is Invalid, Modified, or Forwarded.

19 Claims, 13 Drawing Sheets

Related U.S. Application Data continuation of application No. 15/821,704, filed on Nov. 22, 2017, now Pat. No. 10,552,042.

(60) Provisional application No. 62/554,896, filed on Sep. 6, 2017.

(51) Int. Cl.
*G06F 12/0831* (2016.01)
*G06F 12/1009* (2016.01)

(52) U.S. Cl.
CPC .......... *G06F 9/467* (2013.01); *G06F 12/0831* (2013.01); *G06F 12/1009* (2013.01); *G06F 2212/621* (2013.01); *G06F 2212/65* (2013.01)

(56) References Cited

U.S. PATENT DOCUMENTS

| | | |
|---|---|---|
| 8,065,476 B2 | 11/2011 | Cheriton |
| 8,230,168 B2 | 7/2012 | Cheriton |
| 8,397,049 B2 | 3/2013 | Wang et al. |
| 8,504,791 B2 | 8/2013 | Cheriton et al. |
| 8,612,673 B2 | 12/2013 | Cheriton |
| 8,938,580 B2 | 1/2015 | Cheriton |
| 9,043,555 B1 | 5/2015 | Khona et al. |
| 9,092,151 B1 | 7/2015 | Floyd et al. |
| 9,208,031 B2 | 12/2015 | Mace et al. |
| 9,384,205 B1 | 7/2016 | Gipp et al. |
| 9,501,421 B1 | 11/2016 | Cheriton |
| 9,520,193 B2 | 12/2016 | Cheriton |
| 9,672,216 B2 | 6/2017 | Brosch |
| 10,445,000 B2 | 10/2019 | De Jong et al. |
| 2008/0235461 A1* | 9/2008 | Tan ..................... G06F 13/1668 711/146 |
| 2013/0275699 A1 | 10/2013 | Cheriton |
| 2015/0074339 A1 | 3/2015 | Cheriton |
| 2016/0147797 A1 | 5/2016 | Dolph et al. |
| 2016/0291891 A1 | 10/2016 | Cheriton |
| 2016/0306853 A1 | 10/2016 | Sabaa et al. |
| 2017/0068459 A1 | 3/2017 | Colvig et al. |
| 2017/0090816 A1 | 3/2017 | Tsirkin et al. |
| 2017/0109049 A1 | 4/2017 | Cheriton |
| 2017/0132243 A1 | 5/2017 | Lewis et al. |

FOREIGN PATENT DOCUMENTS

| | | |
|---|---|---|
| KR | 20070096195 A | 10/2007 |
| KR | 20170021287 A | 2/2017 |

OTHER PUBLICATIONS

Final Office Action for U.S. Appl. No. 16/735,688, filed Jan. 29, 2021.
Kim, Yoongu, Cheriton et al., "HICAMP: Architectural Support for Efficient Concurrency-Safe Shared Structured Data Access," ASPLOS 2012, Nov. 18, 2013, 43 pages.
Litz et al., "Fine-grain Memory Deduplication for In-memory Database Systems," Sep. 23, 2013, 22 pages.
Notice of Allowance for U.S. Appl. No. 15/821,704, filed Oct. 2, 2019.
Notice of Allowance for U.S. Appl. No. 16/735,688, filed May 14, 2021.
Office Action for U.S. Appl. No. 15/821,704, filed May 23, 2019.
Office Action for U.S. Appl. No. 16/735,688, filed Sep. 8, 2020.
Stevenson, John Peter, Fine-Grain In-Memory Deduplication for Large-Scale Workloads, A dissertation submitted to the Department of Electrical Engineering and the Committee on Graduate Studies of Stanford University in partial fulfillment of the requirements for the Degree of Doctor of Philosophy, Dec. 2013, 140 pages.

* cited by examiner

EFFECTIVE TRANSACTION TABLE WITH PAGE BITMAP

RELATED APPLICATION DATA

This application is a continuation of U.S. patent application Ser. No. 16/735,688, filed Jan. 6, 2020, now allowed, which is a continuation of U.S. patent application Ser. No. 15/821,704, filed Nov. 22, 2017, now U.S. Pat. No. 10,552, 042, issued Feb. 4, 2020, which claims the benefit of U.S. Provisional Patent Application Ser. No. 62/554,896, filed Sep. 6, 2017, all of which are incorporated by reference herein for all purposes.

FIELD

The inventive concepts relate generally to memory, and more particularly to improving read access time using memory, such as dedupable memory.

BACKGROUND

Deduplicated (or dedupable) memory provides a more efficient mechanism in which to store data. In traditional memory solutions, each data object is written to its own location in memory. The same data object might be stored in any number of locations in memory, each as a separate copy: the memory system has no way to identify or prevent this repetitious storage of data. For data objects that are large, this repetitious storage of data may be wasteful. Deduplicated memory, which stores only a single copy of any data object, attempts to address this problem.

But dedupable memory has a high latency and a slow performance. Executing a write request for a single piece of data may require actually writing data three times and reading data five times in the worst case. This high latency may be a deterrent in systems that need memory to be responsive.

A need remains for a way to improve the responsiveness of memory, whether or not subject to deduplication.

DETAILED DESCRIPTION

Figure 1:
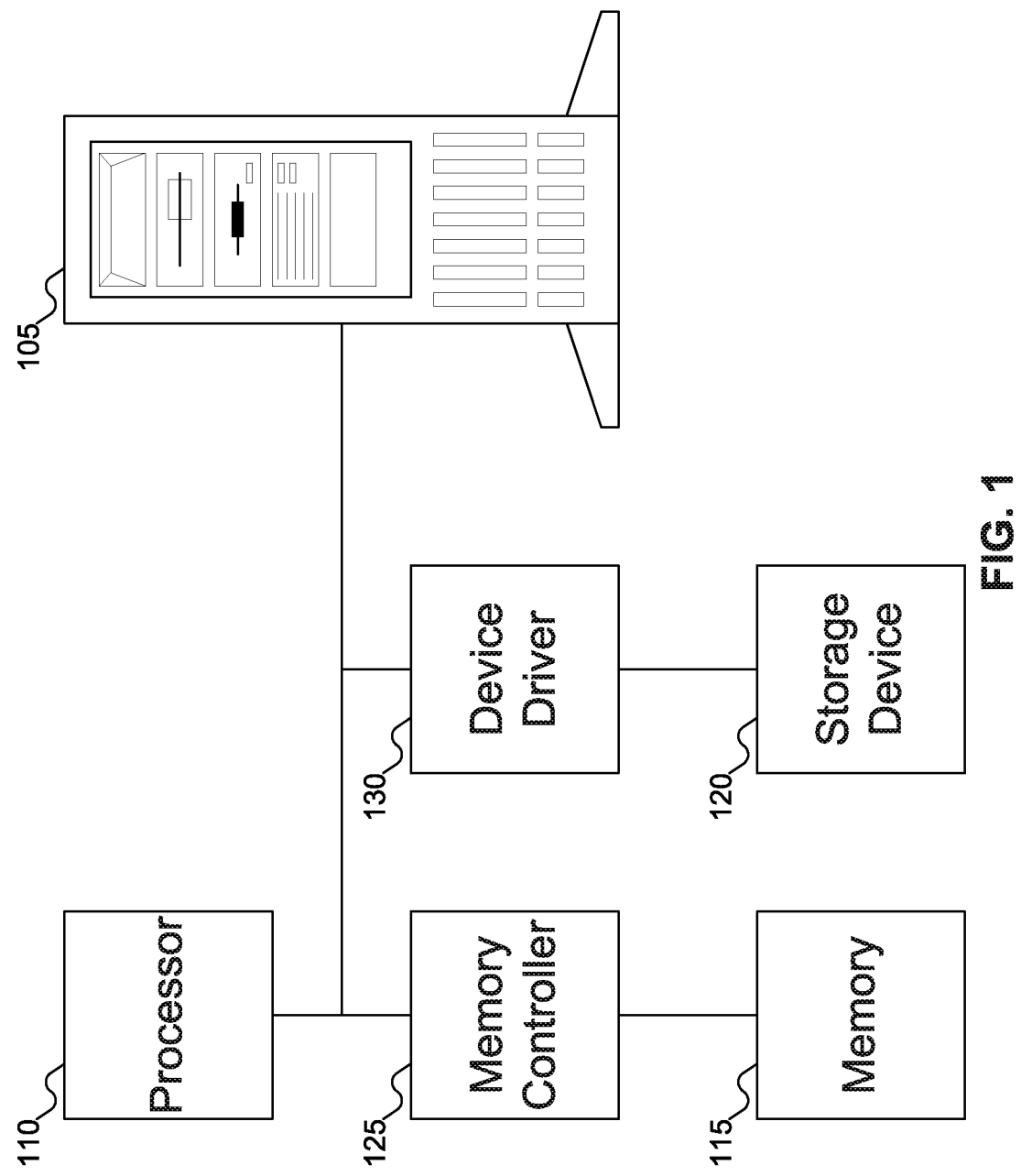
FIG. 1 shows a machine operative to use dedupable memory, according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

One of the challenges of deduplicated memory storage systems is read and write transaction amplification. Read amplification for deduplicated memory may result in two reads to the device for every read request by the host machine. Write amplification may be worse: in the worst case, one write transaction from the host could be amplified into three write transactions as well as five read transactions.

To overcome this challenge and to achieve high throughput and low latency, an effective Transaction Manager may support multiple outstanding transactions and provide early acknowledgement for write transactions, while supporting multiple read transactions and read priority to reduce read latency.

To support read priority, early write acknowledgments, and multiple outstanding write and read transactions, the Transaction Manager may track a large number of outstanding write transaction addresses, and also may keep commands in order for Read After Write transactions, and for posted write transactions.

The Transaction Manager includes:

A Write Coalescing Buffer for partial writes.

A Read Data Mux of the read data path.

A Write Data Buffer to buffer multiple outstanding write transactions.

A Transaction Table to track the multiple outstand write transactions/threads with Invalid (or Idle)/Modified/Forwarded states.

A Command Parser that contains Command Queues (CQ) for write and internal read commands, and Priority Queues (PQ) for host read transactions.

The Transaction Manager is the central controller mechanism which manages the multiple outstanding write and read transactions/threads by:

Supporting a configurable write early acknowledge mechanic.

Keeping posted memory writes complete and in order by storing the write transaction data and tracking the write transaction stages of Invalid/Modified/Forwarded.

Supporting read transactions with prioritization for low latency by maintaining RAW (Read After Write) Orders.

The Write Data Buffer (WDB) contains the outstanding writes which have been acknowledged to the host. Therefore, the write data entries in WDB need to be managed correctly and efficiently to support multiple transactions/threads to achieve high throughput and low latency.

The Transaction Manager tracks the status at a page granularity for fast search and insertion within the outstanding pages. This scheme optimizes the DMA or burst write transactions, not the random write transactions.

The Page State consists of several possible states:

Invalid: An entry that is empty or data is invalided.

Modified: An entry that contains valid data that has not yet been written to the "back end" memory storage. In the context of this application, the terms "back end" and "front end" (used below) are not intended to imply that there is any physical separation between the components of the memory, but instead identify the portions of the memory subsystem that are between the host processor and the Transaction Manager (the "front end") and the portions of the memory subsystem that are on the other side of the Transaction Manager from the host processor (the "back end"). As far as the Transaction Manager is concerned, the operations of other components of the system, including other parts of the memory subsystem, might be thought of as black boxes, whose physical layout and internal operations might not be known by the Transaction Manager.

Forwarded: An entry that contains valid data which has been sent to back end memory storage but not acknowledge from the back end yet.

The page state may be tracked in the Transaction Table ST[1:0] field.

The Transaction Manager contains a Transaction Table which contains the outstanding pages and the page bitmap for fast search. The Transaction Table may track N×M Cache-line transactions (N pages and M entries per page). Fields:

Full Page (FP):
0: Page is not fully filed with entries; 1: Page is fully filed with entries.
Status (ST[1:0]):
2'b00: Invalid.
2'b01: Modified.
2'b10: Forwarded.
2'b11: Failed.

Note that all the entries in the same page share the same page state. Therefore, all entries in the same page are forwarded to the back end at the same time.

For failed transactions, the failing information will be tracked in Transaction Manager Status registers.

Transaction ID (TID) A Transaction ID assigned to the data when sent to the back end.

Note: For a partial filed page, the TID is the TID for the first entry. An incremental TID may be assigned to the rest of the entries in the same page.

Page Head Logical Address (LA): The logical address of the first entry in the page. The rest of the entries' addresses may be derived from this address based on the bitmap (the logical address of any one entry may be computed as "Page Head Logical Address+offset of the page indicated by bitmap").

Entry Bitmap: The valid entry bitmap in the current page.

If a transaction is to send data from the WDB to the back end memory storage, The Transaction Manager updates the ST state of the Transaction Table for the related page entry to "Forwarded". When the sending of data to the back end is completed, the Transaction Manager updates the related page entry status to "Invalid."

If a transaction is a read request, the Transaction Manager may search the Transaction Table for the cache line or DMA page. If the cache line or DMA is found in the Transaction Table, and the ST field of the Transaction Table shows a Modified or Forwarded status, the Transaction Manager may read the Write data buffer and returns the data to the front end. Otherwise the Transaction Manager may send the read request to a Priority Queue.

If a transaction generated by the Transaction Manager is to flush the WDB, the Transaction Manager may stop accepting any new write transaction and wait for the acknowledgement from WDB to empty the associated transaction table entries.

If the transaction is to write data and the ST entry in the Transaction Table for the data is Modified, the Transaction Manager may sends the write to the WDB for merger.

If the transaction is to write data and the ST entry in the Transaction Table for the data is not Modified, or there is no TT entry:

For a full write, the Transaction Manager may create a new Transaction Table entry, store the write data to the WDB, and send the write command to the Command Queue.

For a partial write, if the Transaction Table's ST entry is Forwarded, the Transaction Manager may send a read request to the WDB, merge the partial data with the read data, create a new Transaction Table entry for the transaction, store the data in the WDB, and put the write command into the Command Queue. If the Transaction Table's ST entry is not Forwarded, the Transaction Manager may send a read command to the Command Queue to read the rest of the data from memory storage, merge that data with the partial data, create a new entry for the transaction in the Transaction Table, store the data in the WDB, and send the write command to the Command Queue.

FIG. 1 shows a machine operative to use memory with a Transaction manager, according to an embodiment of the inventive concept. In FIG. 1, machine 105 is shown. Machine 105 may be any desired machine, including without limitation a desktop or laptop computer, a server (either a standalone server or a rack server), or any other device that may benefit from embodiments of the inventive concept. Machine 105 may also include specialized portable computing devices, tablet computers, smartphones, and other computing devices. Machine 105 may run any desired applications: database applications are a good example, but embodiments of the inventive concept may extend to any desired application.

Machine 105, regardless of its specific form, may include processor 110, memory 115, and storage device 120. Processor 110 may be any variety of processor: for example, an Intel Xeon, Celeron, Itanium, or Atom processor, an AMD Opteron processor, an ARM processor, etc. While FIG. 1 shows a single processor, machine 105 may include any number of processors, each of which may be single core or multi-core processors. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may also be any desired combination of different memory types. Memory 115 may be controlled by memory controller 125, also part of machine 105.

Storage device 120 may be any variety of storage device. Storage device 120 may be controlled by device driver 130, which may reside within memory 115.

Figure 2:
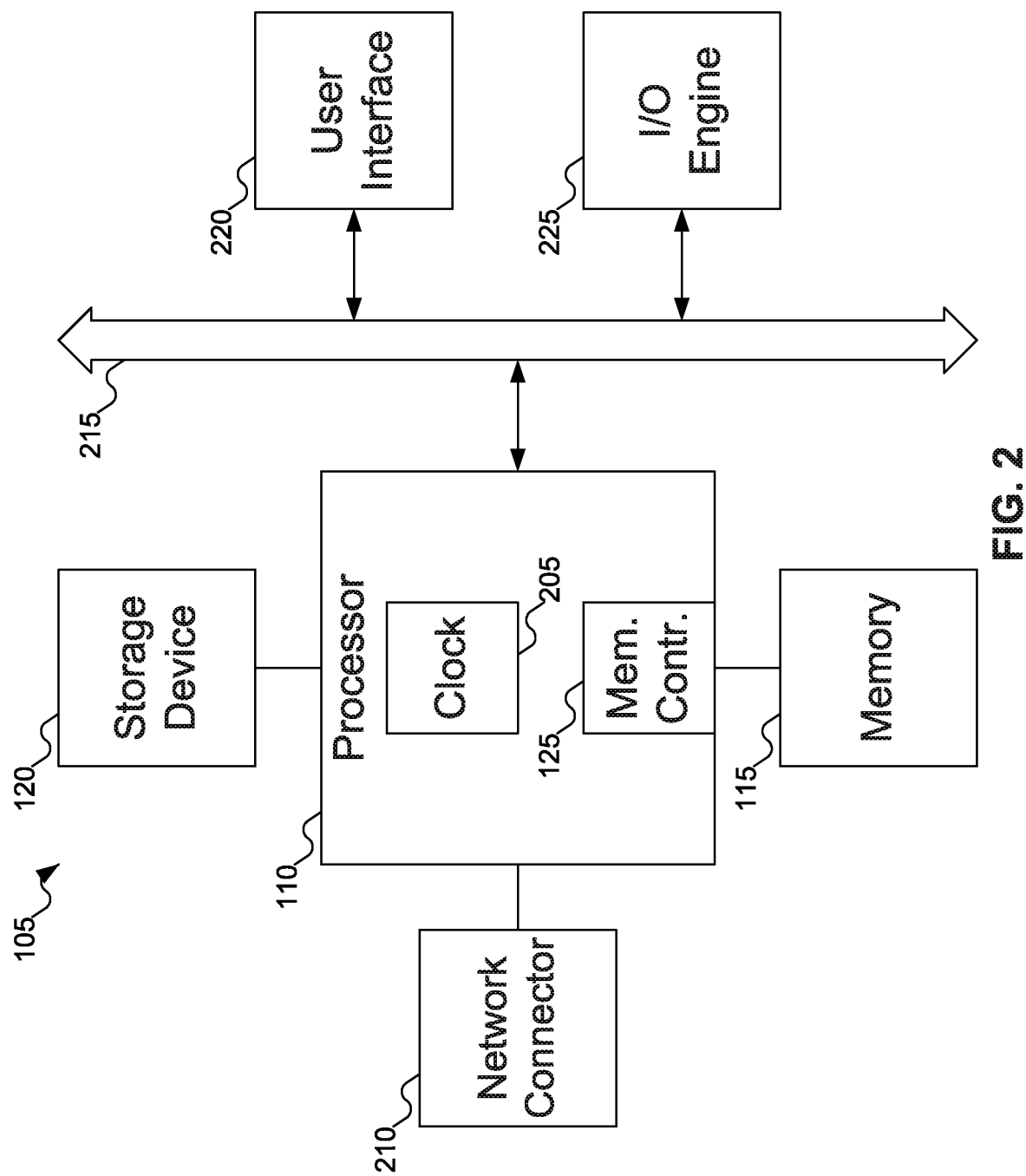
FIG. 2 shows additional details of the machine of FIG. 3.

FIG. 2 shows additional details of machine 105 of FIG. 1. Referring to FIG. 2, typically, machine 105 includes one or more processors 110, which may include memory controller 125 and clock 205, which may be used to coordinate the operations of the components of machine 105. Processors 110 may also be coupled to memory 115, which may include random access memory (RAM), read-only memory (ROM), or other state preserving media, as examples.

Processors 110 may also be coupled to storage devices 120, and to network connector 210, which may be, for example, an Ethernet connector or a wireless connector. Processors 110 may also be connected to a bus 215, to which may be attached user interface 220 and Input/Output interface ports that may be managed using Input/Output engine 225, among other components.

In FIGS. 1-2, memory 115 may be a conventional memory (where eliminating data duplication is not an objective) or dedupable memory. While the implementation of dedupable memory may vary from more traditional forms of memory, such as Dynamic Random Access Memory (DRAM), these differences may not be relevant to the implementation of dedupable memory, or to the implementation of the Transaction Manager. Furthermore, whether other hardware components of machine 105, such as processor 110, are aware of the specific implementation of memory 115 may depend on whether those components need to know the physical structure of memory 115. This "lack of knowledge" about the specific implementation of memory 115 may also extend to software elements, such as application programs running on machine 115. Application programs might send read and write requests to memory 115 without any knowledge of whether memory 115 includes DRAM, dedupable memory, or any other form of memory. In the remainder of this application, memory 115 will be described with reference to dedupable memory, but embodiments of the inventive concept extend to other forms of memory without limitation, and the Transaction Manager may improve the performance of other forms of memory in a similar manner.

Figure 3:
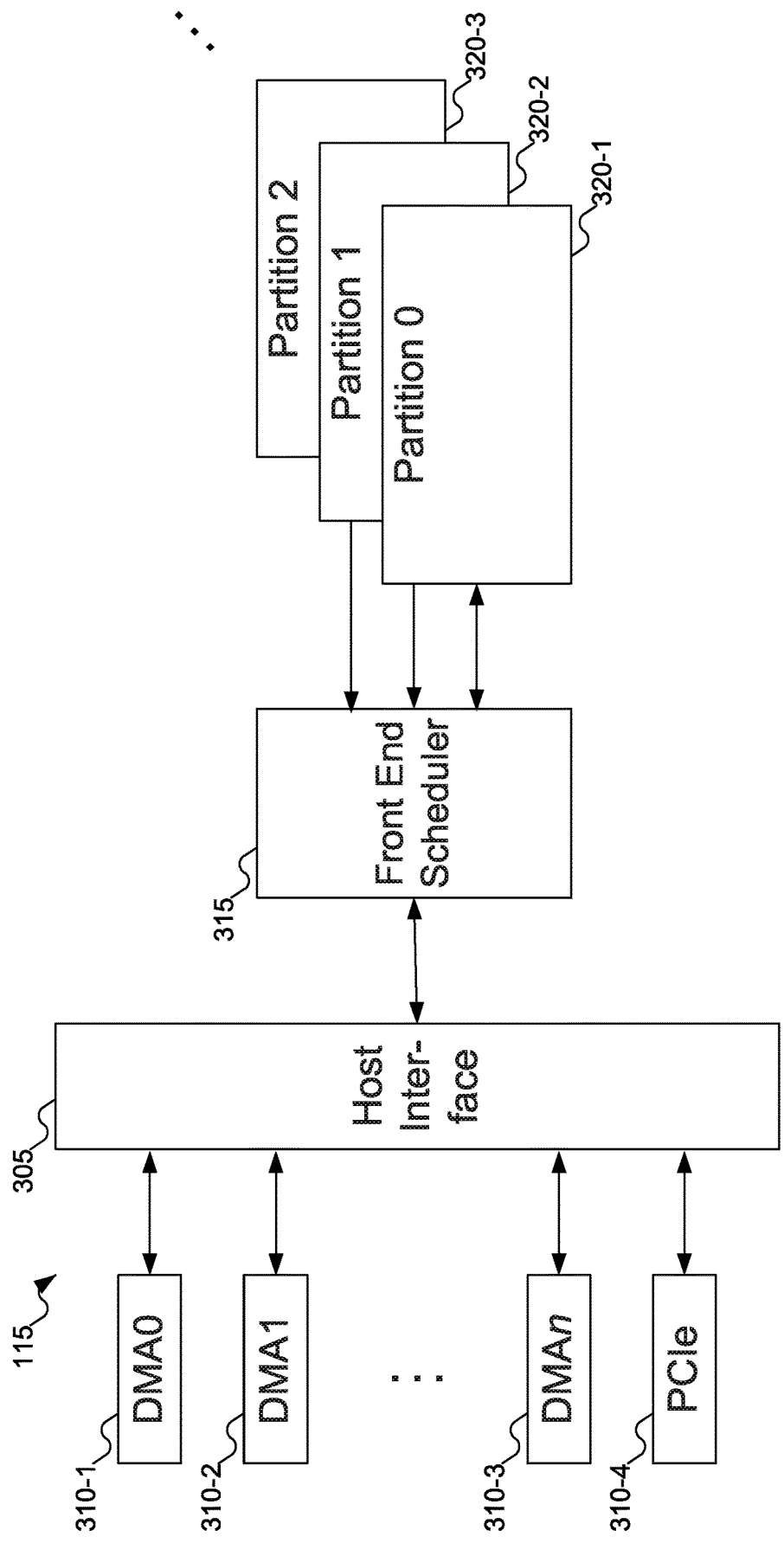
FIG. 3 shows the front end of the memory of FIG. 1.

FIG. 3 shows the front end of memory subsystem 115 of FIG. 3. In FIG. 3, memory 115 may include host interface 305. Host interface may receive requests (either read or write) from various sources using any desired interfaces. Such sources may include, for example, Direct Memory Access lines 310-1 through 310-3, Peripheral Component Interconnect Express (PCIe) 310-4, or conventional Memory Bus connections (not shown). Sources 310-1 through 310-4 may represent sources for applications, operating systems, or any other sources of data requests. Host interface 305 may then communicate with front end scheduler 315, which may distribute data requests to any of partitions 320-1 through 320-3, which include the dedupable memory and may then process and respond to the data requests.

While FIG. 3 shows four sources 310-1 through 310-4, and three partitions 320-1 through 320-3, these numbers are merely examples. Embodiments of the inventive concept may support any number of sources and any number of partitions without limitation. In addition, the sources may be of any desired form: sources are not limited to DMA and PCIe communications.

Figure 4:
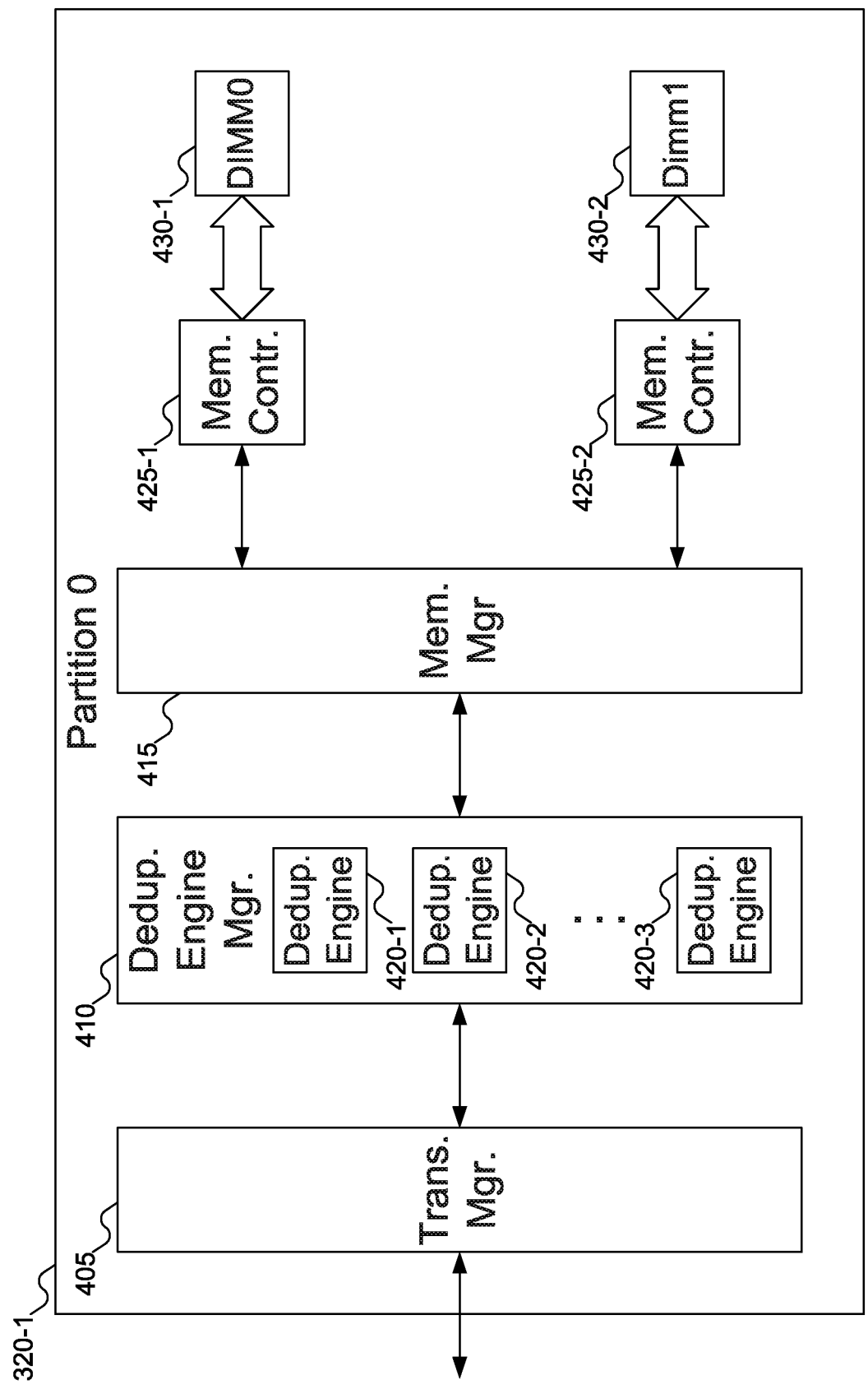
FIG. 4 shows the back end of the memory of FIG. 1.

FIG. 4 shows the back end of memory 115 of FIG. 1. In FIG. 4, partition 320-1 is shown, but the same architecture may be used in partitions 320-2 and 320-3 of FIG. 3. Partition 320-1 may include transaction manager 405, deduplication engine manager 410, and memory manager 415. Transaction manager 405 is responsible for managing data requests, and may improve the latency of read requests as compared with a deduplication memory architecture that omits transaction manager 405. Transaction manager 405 is discussed further with reference to FIG. 5 below.

Deduplication engine manager 410 is responsible for handling the specific reading and writing of data and eliminating data duplication. To that end, deduplication engine manager 410 may include various deduplication engines 420-1 through 420-3. Each deduplication engine 420-1 through 420-3 may determine whether any received user data has been stored before and if so, may prevent storing the same data a second time in memory 115.

Deduplication engine manager 410 (and therefore deduplication engines 420-1 through 420-3) may communicate with memory manager 415. Memory manager 415 is responsible for directing specific data requests to the appropriate memory hardware. For example, FIG. 4 shows two memory controllers 425-1 and 425-2, communicating with Dual In-Line Memory Modules (DIMMs) 430-1 and 430-2. Embodiments of the inventive concept may support any physical form used to store data. For example, DIMMs 430-1 and 430-2 may be replaced with Dual In-line Packages (DIPs), Single In-line Packages (SIPs), Single In-line Memory Modules (SIMMs), or even just the memory chips themselves. In the remainder of this application, the term "memory module" is intended to encompass all such variations on the form taken to store data. Memory manager 415 may direct any data requests received from deduplication engine manager 410 to either of memory controllers 425-1 or 425-2, depending on where the actual data is stored (or is to be stored); memory controllers 425-1 and 425-2, in turn, manage the actual reading and writing of data from DIMMs 430-1 and 430-2.

While FIG. 4 shows three deduplication engines 420-1 through 420-3 and two memory controllers 425-1 and 425-2 (communicating with two memory modules 430-1 and 430-2), embodiments of the inventive concept may include any number of deduplication engines and any number of memory controllers and memory modules (although typically there is a one-to-one relationship between memory controllers and memory modules). Further, while FIG. 4 shows memory modules 430-1 and 430-2 as DIMMs, embodiments of the inventive concept may support any desired memory module format, and may also support mixed formats: for example, some memory modules being DIMMs and others being Small Outline Dual In-Line Memory Modules (SODIMMs). Each partition 320-1 through 320-3 of FIG. 3 may also include varying numbers and types of deduplication engines and memory modules.

As mentioned above, a deduplication memory system may operate without transaction manager 405. However, because of the amplification factor, such a deduplication memory system may have a high latency. Even conventional memory subsystems, which might not experience amplification to the same extent as deduplication memory, may experience a sufficiently high read or write latency. By including transaction manager 405 in the deduplication (or other) memory system architecture, the amplification factor may be reduced by coalescing partial write data and by early write acknowledgment to the host, improving the performance of the memory system.

Figure 5:
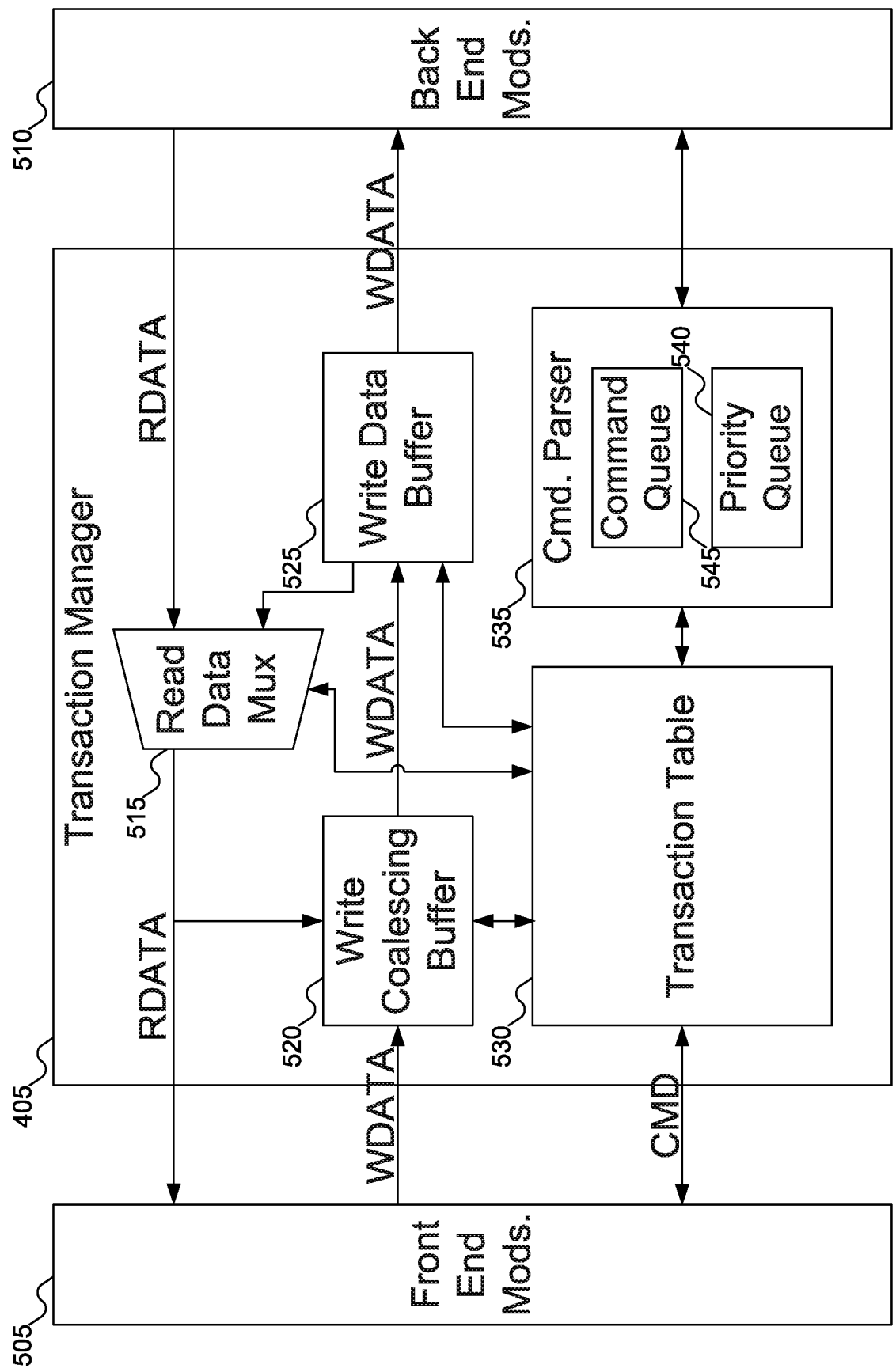
FIG. 5 shows details of the transaction manager of FIG. 4.

FIG. 5 shows details of transaction manager 405 of FIG. 4. In FIG. 5, transaction manager 405 is shown interfacing with front end 505 and back end 510. Front end 505 is intended to represent front end scheduler 315 of FIG. 3, along with all the other components that are implicated "before" transaction manager 405. Similarly, back end 510 is intended to represent deduplication engine manager 410 of FIG. 4, along with all the other components that are implicated "after" transaction manager 405. Since the memory system architecture may operate without transaction manager 405, from the point of view of transaction manager 405, front end 505 and back end 510 may be considered black boxes, whose internal operations are unknown. Front end 505, transaction manager 405, and back end 510 may communicate using standard protocols.

Transaction manager 405 may include read data multiplexer (mux) 515, write data coalescing buffer 520, write data buffer 525, transaction table 530, and command parser 535. Read data mux 515 may receive read data from write data buffer 525 (if the requested data was buffered for a deferred write) or back end 510 (if the data is not in write data buffer 525). If the data needs to be retrieved from back end 510, transaction manager 405 may place a read request in priority queue 540 of command parser 535, which back end 510 may process to locate and return the requested data.

Write data buffer 525 may store data that is buffered for writing to back end 510. When transaction manager 405 receives a write request from front end 505, transaction manager 405 may store the write data in write data buffer 525, and may store the write request in command queue 545 of command parser 535. Transaction manager 405 may then send an early acknowledgement back to front end 505 (early in the sense that the data has not yet been written to its ultimate storage location in memory, but is buffered for writing at a later time). Data that has been previously buffered in write data buffer 525 but not yet written to and acknowledged by back end 510 may be read into read data mux 515 in response to a read request. The size of write data buffer 525 may vary and may depend on the speed of the memory modules in back end 510: the slower the memory modules are, the larger write data buffer 525 may need to be. Ideally, at a minimum, write data buffer 525 should be large enough to handle a DMA burst to the memory modules. If write data buffer 525 becomes full, transaction manager 405 may generate a flush command to write data to back end 510.

It may happen that a write request does not request to write a full page (or cache line) of data to the memory system. But writes to the memory module should be of complete pages. So if front end 505 only sent a partial write, transaction manager 405 may "merge" that partial write with the rest of the data needed to complete the write. For example, if the write request is a partial cache line write, transaction manager 405 may merge that partial write with the rest of the data in the cache line, which may be read from the memory. Write coalescing buffer 520 operates to handle this process. Write coalescing buffer 520 requests the remaining data needed to complete the page or cache line (which might be find in write data buffer 525 or might have to be read from back end 510), merges the partial write with that data, stores the complete page or cache line in write data buffer 525, and (potentially) stores a write request in command queue 545 of command parser 535. In this context, "merging" means to change the portions of the read data as per the write request, leaving the other portions of the read data unchanged.

Whether write coalescing buffer 520 receives the remaining data from back end 510 or reads the remaining data from write data buffer 525 depends on whether the remaining data may be found in write data buffer 525. If the remaining data may be found in write data buffer 525, then there is no need to request the data from back end 510 (which would be a slower operation and might return data that is out-of-date).

But if write data buffer 525 already stores a full page of data, there is a question of how to handle the conflicting entries. The solution to this problem is to determine whether the existing page in write data buffer 525 has been sent to back end 510 or not. If the existing page in write data buffer 525 has already been sent to back end 510, then the new page is stored as a separate page of data in write data buffer 525. This new page of data will eventually be written to back end 510 to replace the page that was already written.

On the other hand, if the existing page in write data buffer 525 is still waiting to be sent to back end 510, then the existing page may be updated in write data buffer 525. In this situation, the page is sent to back end 510 only once, avoiding the repeated writes to back end 510.

To determine whether a page in write data buffer 525 has been sent to back end 510 or not, transaction table 530 may be used. Transaction table 530 may store information about the state of data in write data buffer 525. Each page in write data buffer 525 may have one of four states: Invalid, meaning that the page does not store any data waiting to be written to back end 510; Modified, meaning that the page contains data waiting to be written to back end 510, but not yet sent to back end 510; Forwarded, meaning that the page contains data that has been sent to back end 510; and Failed, which represents an error condition. The number of entries in transaction table 530 may correspond to the number of pages stored in write data buffer 525.

Note that a single page in write data buffer 525 might store data for multiple write requests. For example, assume that a cache line stores 64 bytes, and each page in the memory stores 4096 bytes. This means that there are 64 cache lines per page. As a result, it might happen that one or more pages in write data buffer 525 includes some cache lines with valid data and some that are empty. The entries in transaction table 530 are discussed further below with reference to FIG. 6.

When write coalescing buffer 520 is ready to store a page or cache line in write data buffer 525, the state of the existing data in write data buffer 525, as recorded in transaction table 530, may indicate whether the existing page or cache line may be overwritten or a new page or cache line needs to be written. If the existing page (or the page that includes the cache line in question) has the Modified state, then the existing page or cache line has not yet been sent to back end 510, and the existing page or cache line may be modified to include the data from the partial write request. On the other hand, if the existing page (or the page that includes the cache line in question) has the Forwarded state, then the existing page has already been sent to back end 510, and a new page is stored in write data buffer 525. (If no page containing the cache line matching the page logical address can be found in transaction table 530, then a new page or cache line may be added to write data buffer 525, and a corresponding entry may be created in transaction table 530.)

Command parser 535 may include two queues: command queue 545 and priority queue 540. Command queue 545 may be thought of as a standard priority queue, as compared with priority queue 540, which may be thought of as a high priority queue. Command queue 545 may be used for internally generated read requests (such as when transaction manager 405 needs data from back end 510 for internal reasons) and write requests, whereas priority queue 540 may be used for externally generated read requests (such as read requests originating from front end 505). In this manner, externally generated read requests may achieve a low latency (externally generated write requests achieve a low latency as a result of the early acknowledgement of write requests). While FIG. 5 shows only one command queue 545 and one priority queue 540, embodiments of the inventive concept may support any number of command queues 545 and priority queues 540, and do not require the number of command queues and the number of priority queues to be equal.

Transaction manager 405 may achieve a fast search for data in write data buffer 550: searches may be completed in one cycle. Transaction manager 405 may also achieve a fast insertion of a new page into write data buffer 525.

Figures 6, 7:
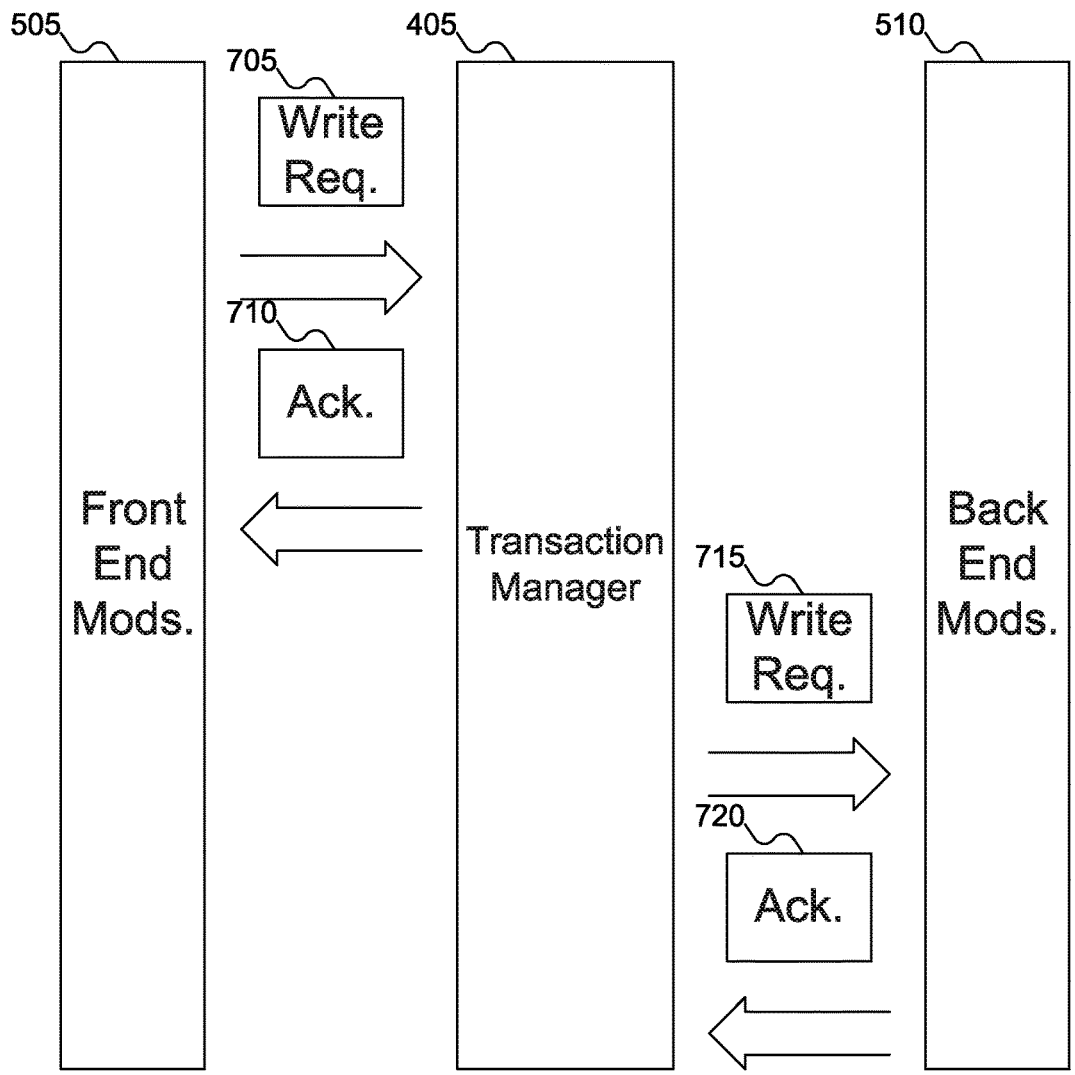
FIG. 6 shows details of the transaction table of FIG. 5.
FIG. 7 shows the transaction manager of FIG. 5 processing a write request from the front end of FIG. 5 of the memory of FIG. 1.

FIG. 6 shows details of transaction table 530 of FIG. 5. In FIG. 6, transaction table 530 may include entries, such as entry 605. Transaction table 530 may include one entry for each page in write data buffer 525 of FIG. 5. Each entry may include information, such as: a full page bit, indicating whether the page contains a full page of data or only a partial page; state bits, indicating whether the page in question is Invalid, Modified, Forwarded or Failed; a transaction ID, which may be assigned to transactions posted to back end 510 by transaction manager 405 of FIG. 5, a page logical address, which may be the base address of the page being written to back end 510 of FIG. 5, and an entry bitmap that may indicate which cache lines within the page contain valid data. For example, the entry bitmap might include a "0" to indicate that a cache line in the page is empty, whereas the entry bitmap might include a "1" to indicate that a cache line in the page contains valid data. Thus, if the entry bitmap is "111 . . . 1", the entry bitmap represents that the page is full (in which case the full page bit should be set) and all cache lines contain valid data. On the other hand, if any bit in the entry bitmap is "0", then then there is at least one entry in the page that does not contain valid data, and the full page bit ought not to be set. In other words, the full page bit can be computed as a logical AND of the bits in the entry bitmap. As a result, storing the full page bit might be unnecessary, but it can save time (avoiding the need to computing the logical AND of the bits in the entry bit map each time a check is made to see if a page is full or not).

FIG. 7 shows transaction manager 405 of FIG. 5 processing a write request from front end 505 of FIG. 5 of memory 115 of FIG. 1. In FIG. 7, front end 505 sends write request 705 to transaction manager 405. Transaction manager 405 may respond with early acknowledgement 710. At some later time, transaction manager 405 may provide write request 715 to back end 510, to complete the write request, which back end 510 may acknowledge as complete with acknowledgement 720.

Not shown in FIG. 7 would be a read request sent from transaction manager 405 to back end 510. For example, if write request 705 is a partial cache line write request and the rest of the cache line entry is not stored in write data buffer 525 of FIG. 5, then transaction manager 405 may need to send a read request to back end 510 to retrieve the cache line and merge the partial write.

Figure 8:
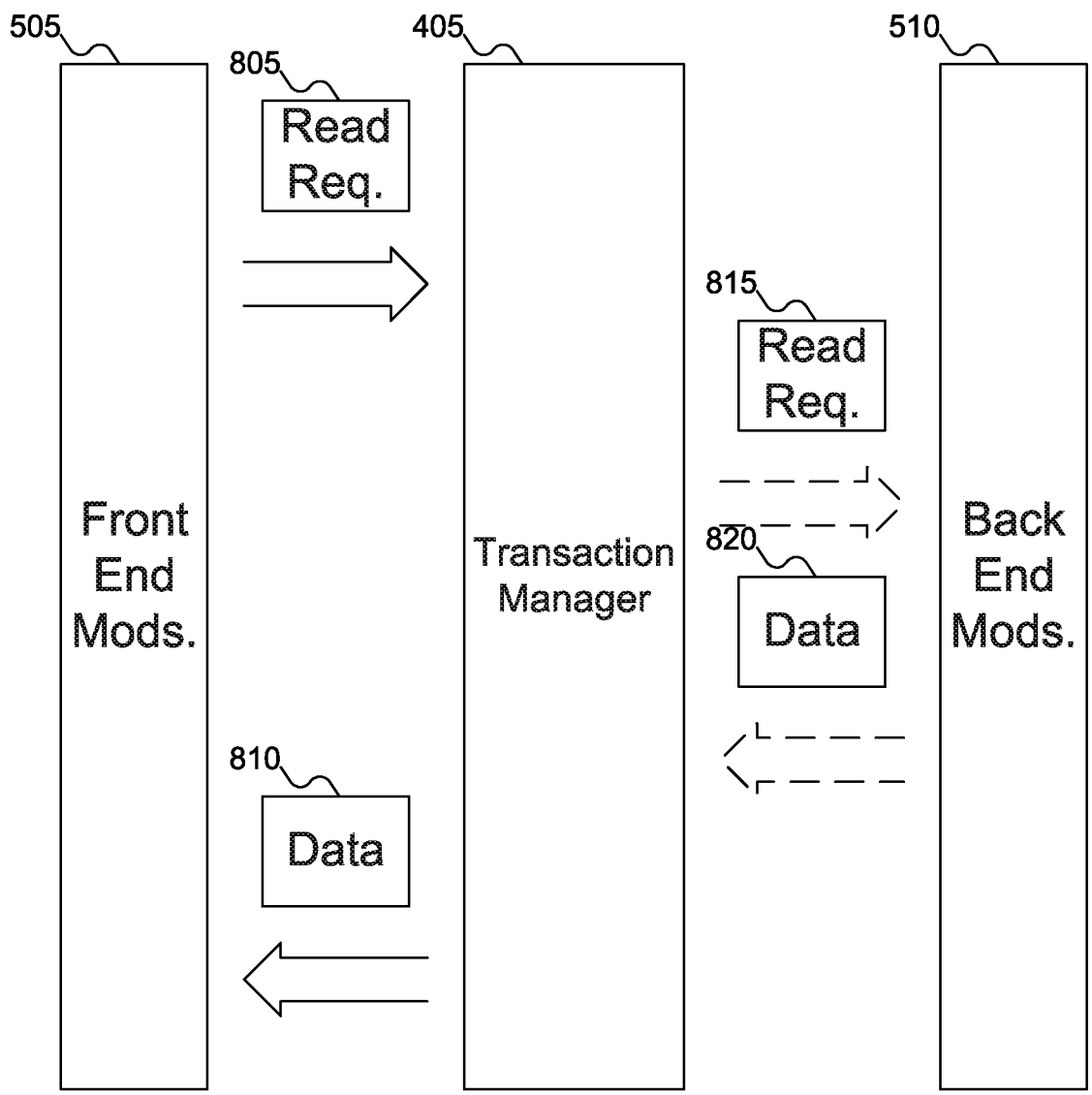
FIG. 8 shows the transaction manager of FIG. 5 processing a read request from the front end of FIG. 5 of the memory of FIG. 1.

FIG. 8 shows transaction manager 405 of FIG. 5 processing a read request from front end 505 of FIG. 5 of memory 115 of FIG. 1. In FIG. 8, at front end 505 may send read request 805 to transaction manager 405. If the requested data is already within transaction manager 405—for example, if the requested data is currently stored in write data buffer 525 of FIG. 5, then transaction manager 405 may respond with data 810 immediately. Otherwise, transaction manager 405 may send read request 815 to back end 510 (via priority queue 540 of FIG. 5) to read the requested data, which may be returned as data 820 (and then forwarded from transaction manager 405 to front end 505 as data 810).

Figure 9:
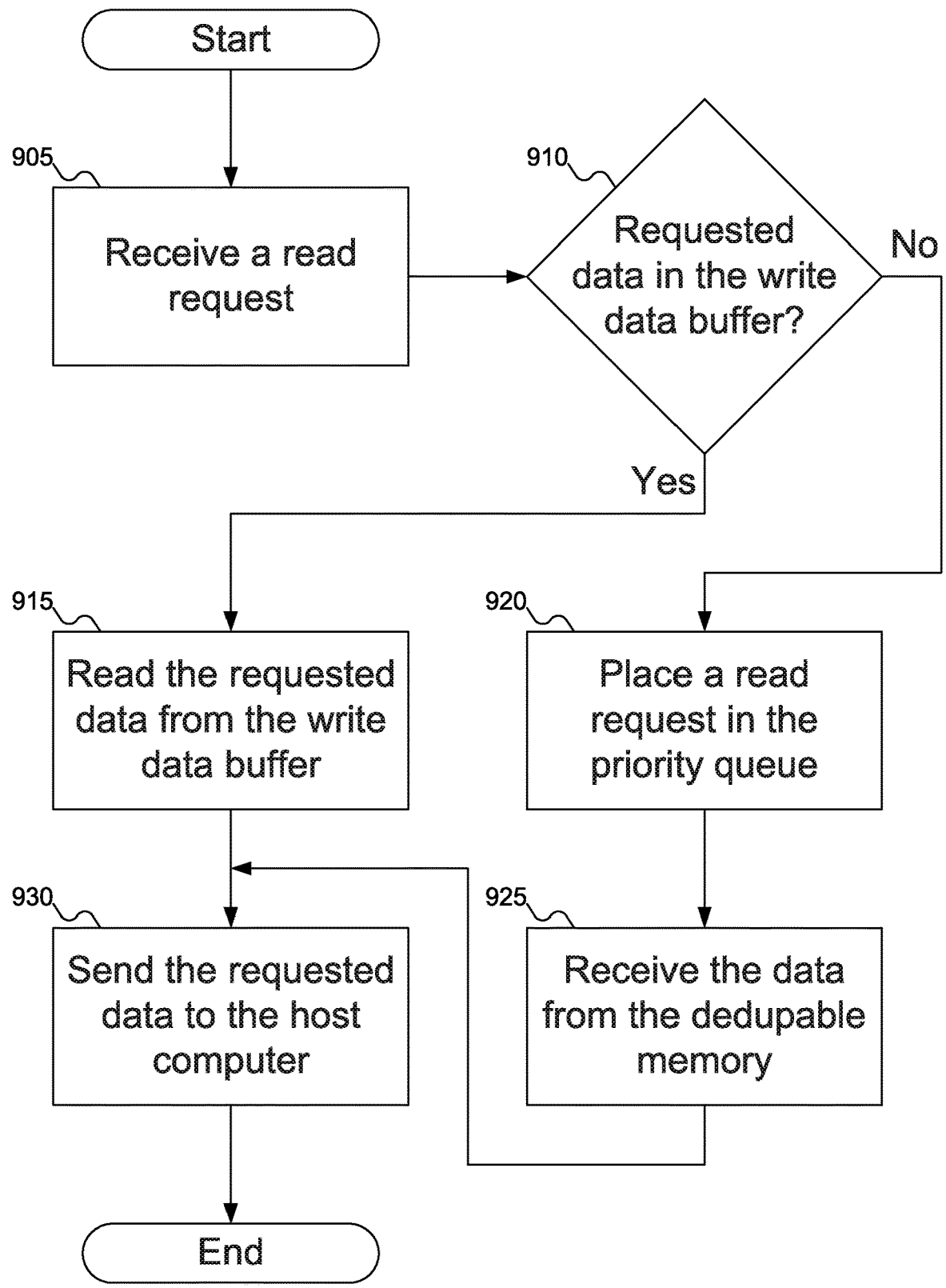
FIG. 9 shows a flowchart of an example procedure for processing a read request from the front end of FIG. 5 of the memory of FIG. 1 by the transaction manager of FIG. 5, according to an embodiment of the inventive concept.

FIG. 9 shows a flowchart of an example procedure for processing a read request from front end 505 of FIG. 5 of memory 115 of FIG. 3 by transaction manager 405 of FIG. 5, according to an embodiment of the inventive concept. In FIG. 9, at block 905, transaction manager 405 of FIG. 5 may receive read request 805 of FIG. 8 from front end 505 of FIG. 5. At block 910, transaction manager 405 of FIG. 5 checks to see if the requested data is in write data buffer 525 of FIG. 5. If the requested data is in write data buffer 525 of FIG. 5, then at block 915 the requested data is read from write data buffer 525 of FIG. 5 into read data mux 515 of FIG. 5. Otherwise, at block 920 transaction manager places a read request in priority queue 540 of FIG. 5 destined for back end 510 of FIG. 5, and at block 925 read data mux 515 of FIG. 5 receives the requested data from back end 510 of FIG. 5. Either way, at block 930, transaction manager 405 of FIG. 5 sends the requested data to front end 505 of FIG. 5.

Figure 10A:
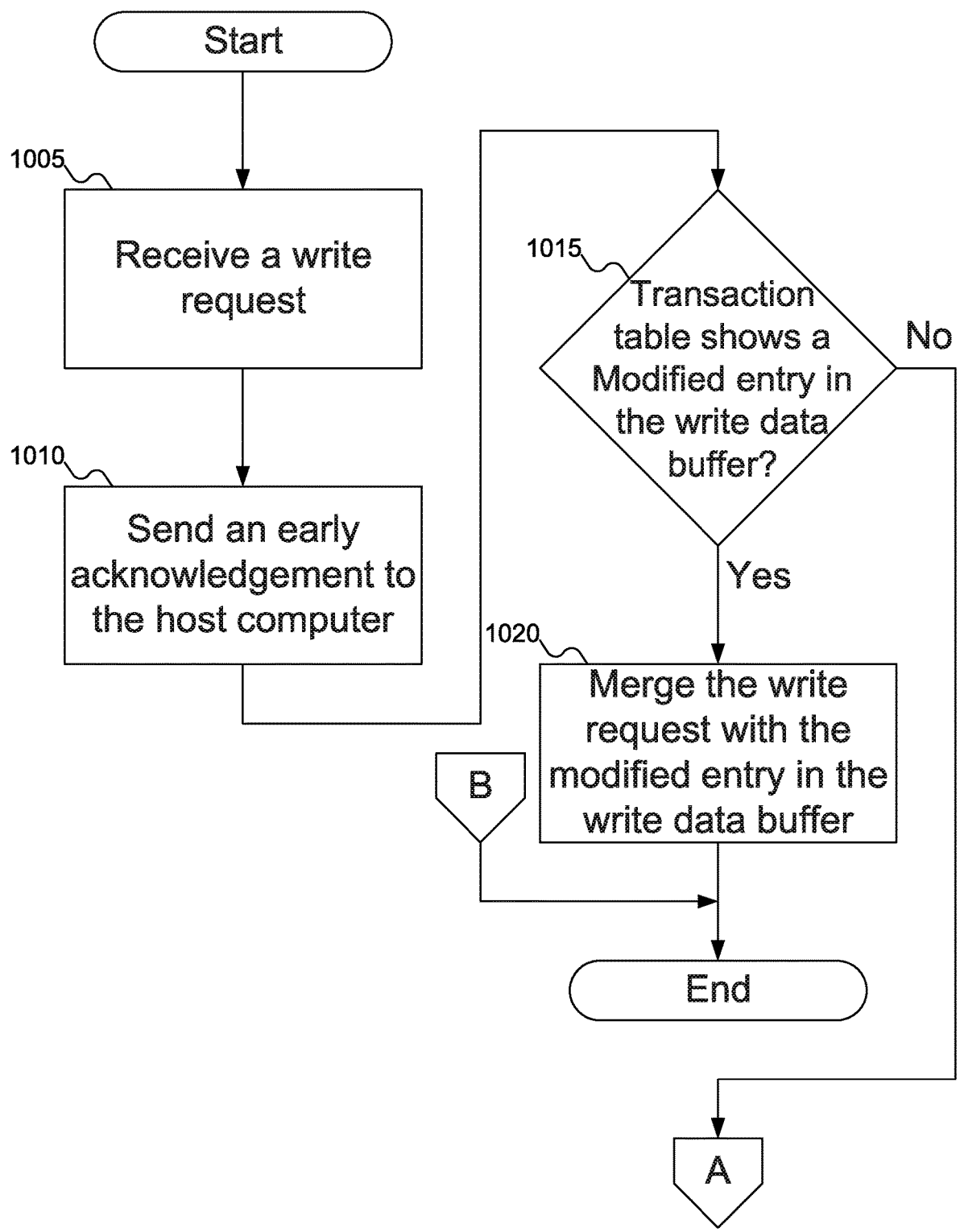
FIGS. 10A-10D shows a flowchart of an example procedure for processing a write request from the front end of FIG. 5 of the memory of FIG. 1 by the transaction manager of FIG. 5, according to an embodiment of the inventive concept.
Figure 10B:
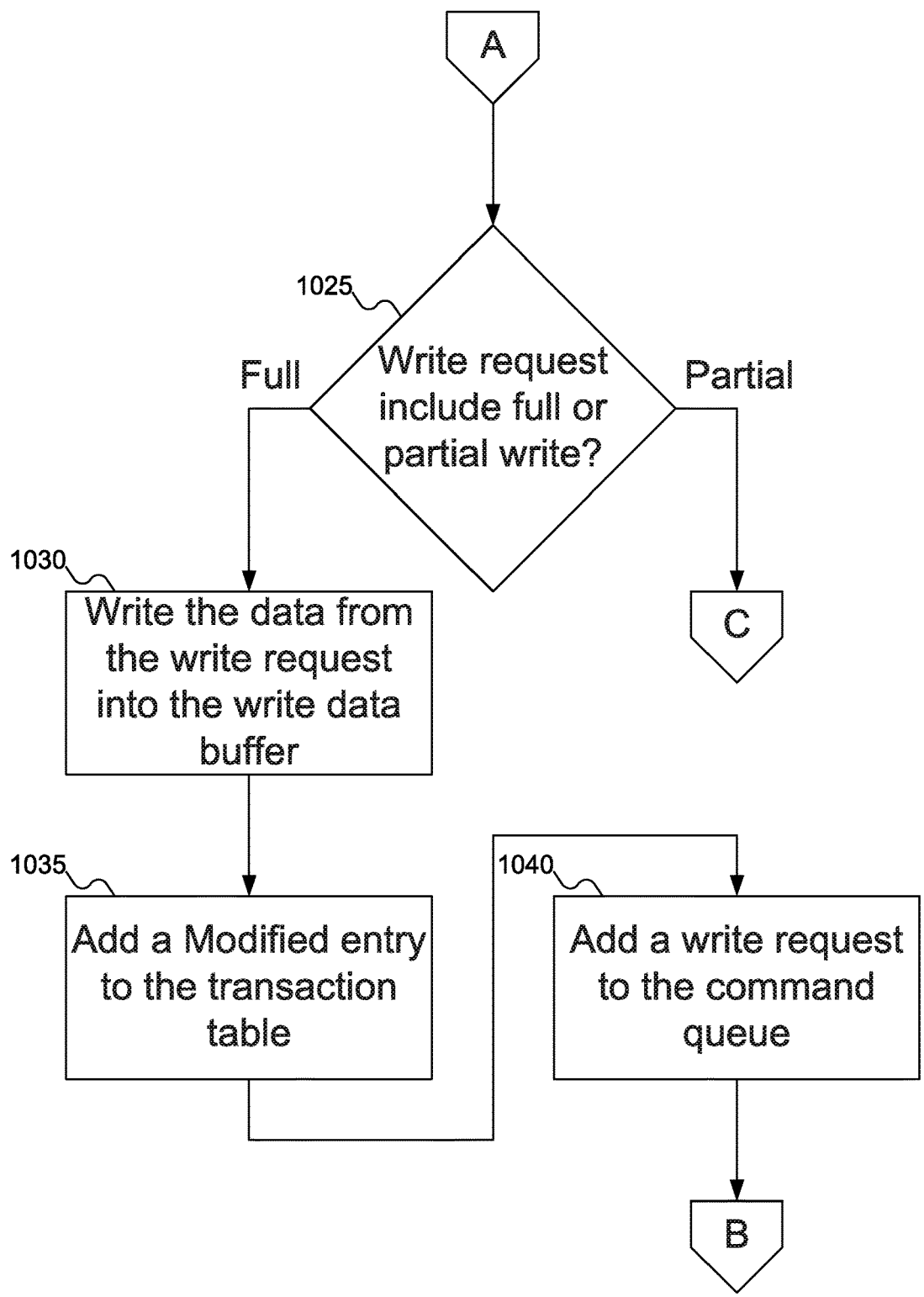
Figure 10C:
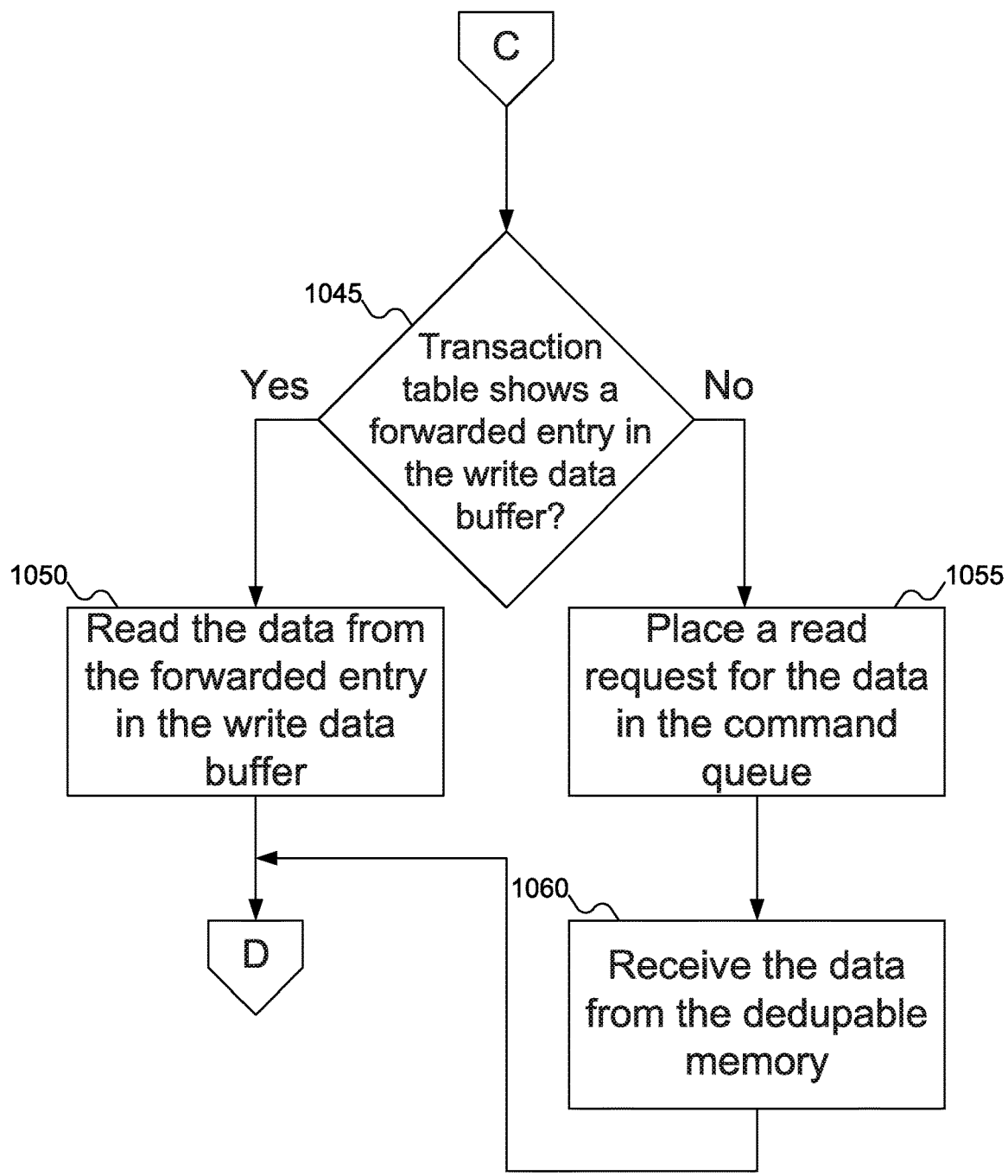
Figure 10D:
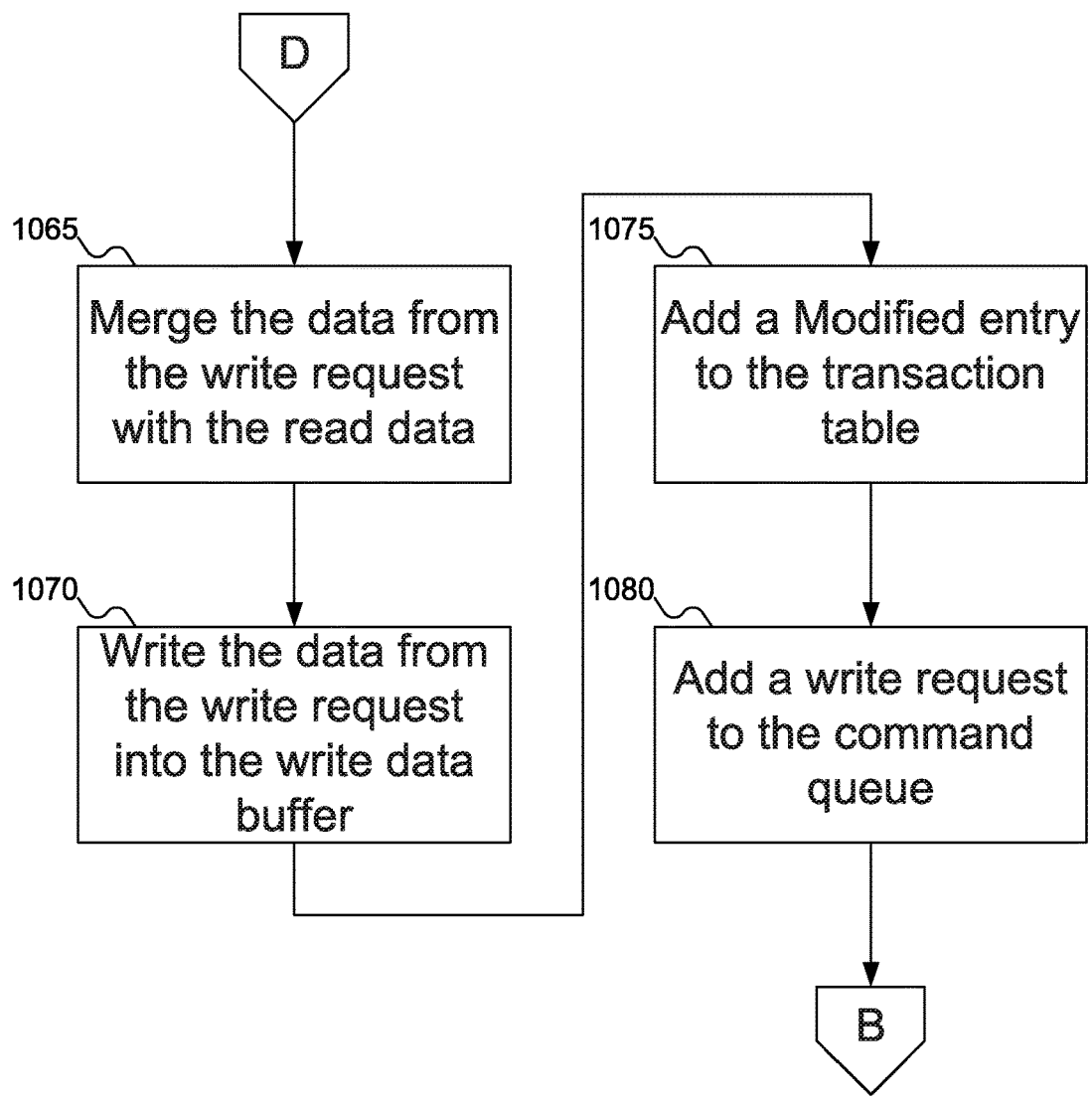

FIGS. 10A-10D shows a flowchart of an example procedure for processing a write request from front end 505 of FIG. 5 of memory 115 of FIG. 1 by the transaction manager of FIG. 5, according to an embodiment of the inventive concept. In FIG. 10A, at block 1005, transaction manager 405 of FIG. 5 may receive write request 705 of FIG. 7 from front end 505 of FIG. 5. At block 1010, transaction manager 405 of FIG. 5 may send an early acknowledgement back to front end 505 of FIG. 5.

At block 1015, transaction manager 405 of FIG. 5 determines whether there is a page in write data buffer 525 of FIG. 5 that includes the logical address to be written, and has a Modified status. If such a page exists in write data buffer 525 of FIG. 5, then at block 1020 transaction manager 405 of FIG. 5 may merge the data from write request 705 of FIG. 7 with the page in write data buffer 525 of FIG. 5, after which processing may end.

Assuming that write data buffer 525 of FIG. 5 does not store a page containing the logical address in write request 705 of FIG. 7 that is in a Modified state, then at block 1025 (FIG. 10B) transaction manager 405 of FIG. 5 may determine if write request 705 of FIG. 7 is a partial write request or a full write request. If write request 705 of FIG. 7 is a full write request, then at block 1030 transaction manager 405 of FIG. 5 may write the data from write request 705 of FIG. 7 into write data buffer 525 of FIG. 5, add an entry to transaction table 530 of FIG. 5 with Modified state at block 1035, and add write request 705 of FIG. 7 to command queue 545 of FIG. 5 at block 1040, after which processing may end. Note that in blocks 1030-1040 there is no concern about creating redundant entries in write data buffer 525 of FIG. 5: either no page exists in write data buffer 525 that includes the logical address of write request 705 of FIG. 7, or the corresponding entry in transaction table 530 of FIG. 5 shows that the page has the Forwarded state, in which case the existing page may not be modified (a check for a page with Modified state was performed in block 1015 of FIG. 10A).

At this point, transaction manager 405 of FIG. 5 has covered the situations where an existing page in write data buffer 525 in a Modified state includes the logical address of write request 705 of FIG. 7, or write request 705 of FIG. 7 is a full write request. The only case that remains is where write request 705 of FIG. 7 is a partial write request and there is no page in write data buffer 525 of FIG. 5 that may be modified responsive to the partial write request. At this point, transaction manager 405 of FIG. 5 may load the full page (or cache line) to merge the partial write request into a full write request for write data buffer 525 of FIG. 5. At block 1045 (FIG. 10C), transaction manager 405 of FIG. 5 may check to see if write data buffer 525 of FIG. 5 includes a page in a Forwarded state that includes the logical address of write request 705 of FIG. 7. If such a page exists, then at block 1050 transaction manager 405 of FIG. 5 may read the data from write data buffer 525 of FIG. 5. Otherwise, at block 1055, transaction manager 405 of FIG. 5 may place a read request for the page in command queue 545 of FIG. 5, and at block 1060, transaction manager 405 of FIG. 5 may receive the requested page from back end 510 of FIG. 5.

At this point, whether transaction manager 405 of FIG. 5 followed block 1050 or blocks 1055 and 1060, transaction manager 405 of FIG. 5 has the rest of the data from the page or cache line. At block 1065 (FIG. 10D), write coalescing buffer 520 of FIG. 5 may merge the data in the partial write request with the full page or cache line as accessed. At block 1070, write coalescing buffer 520 of FIG. 5 may write the merged page or cache line into write data buffer 525 of FIG. 5. At block 1075, transaction manager 405 of FIG. 5 may add an entry to transaction table 530 of FIG. 5 for the page, with a Modified state. Finally, at block 1080, transaction manager 405 of FIG. 5 may place write request 715 of FIG. 7 in command queue 545 of FIG. 5.

Figure 11:
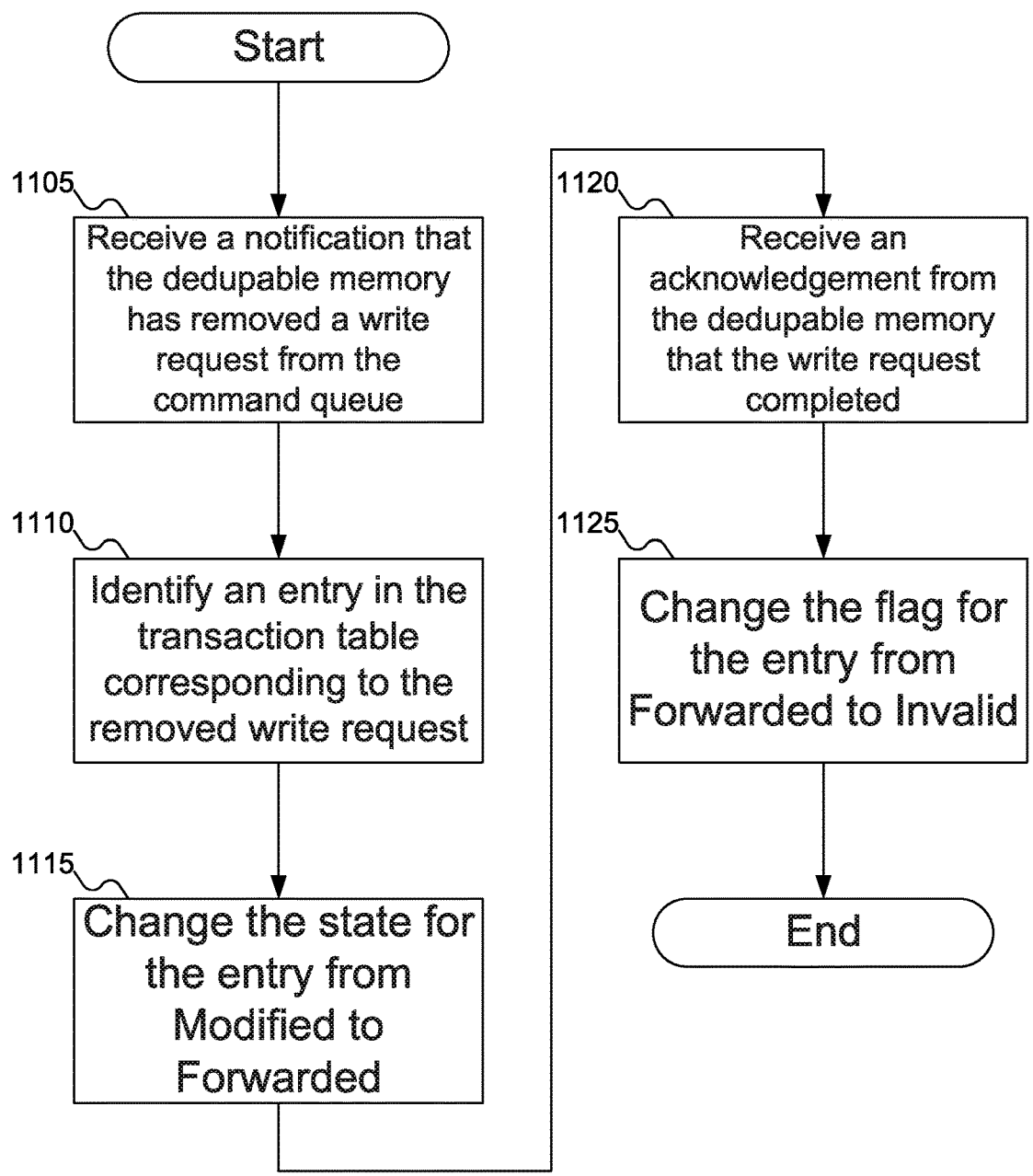
FIG. 11 shows a flowchart of an example procedure for the transaction manager of FIG. 5 to process write transactions completed by the back end of FIG. 5 of the memory of FIG. 1, according to an embodiment of the inventive concept.

FIG. 11 shows a flowchart of an example procedure for transaction manager 405 of FIG. 5 to process write transactions completed by back end 510 of FIG. 5 of memory 115 of FIG. 1, according to an embodiment of the inventive concept. In FIG. 11, at block 1105, transaction manager 405 of FIG. 5 may receive a notification from back end 510 of FIG. 5 that write request 715 of FIG. 7 has been removed from command queue 545 of FIG. 5. At block 1110, transaction manager 405 of FIG. 5 may identify as corresponding entry in transaction table 530 of FIG. 5: for example, using a transaction ID for write request 715 of FIG. 7. At block 1115, transaction manager 405 of FIG. 5 may change the state of the identified entry from Modified to Forwarded (which prevents any future write requests received by transaction manager 405 of FIG. 5 from directly modifying that page in write data buffer 525 of FIG. 5).

At block 1120, transaction manager 405 of FIG. 5 may receive from back end 510 of FIG. 5 an acknowledgement that write request 715 of FIG. 7 has completed. At block 1125, transaction manager 405 of FIG. 5 may then change the state of the identified entry from Forwarded to Invalid, which frees the page in write data buffer 525 of FIG. 5 for use by another page of data.

In FIGS. 9-11, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a transaction manager for use in a memory subsystem with memory, comprising:
a write data buffer to store outstanding write transactions to be written to memory;
a read data multiplexer to select between data read from the write data buffer and the memory;
a command queue to store write requests and internal read requests for the memory;
a priority queue to store external read requests for the memory; and
a transaction table to track outstanding write requests, each write request associated with a state drawn from a set including Invalid, Modified, and Forwarded.

Statement 2. An embodiment of the inventive concept includes a transaction manager according to statement 1, further comprising a write coalescing buffer to merge partial write requests with other data, the other data drawn from a set including data in the memory and data in the write data buffer.

Statement 3. An embodiment of the inventive concept includes a transaction manager according to statement 1, wherein the transaction manager supports early acknowledgement of write requests from a host computer before completing the write requests by the memory.

Statement 4. An embodiment of the inventive concept includes a transaction manager according to statement 1, wherein the memory includes a dedupable memory.

Statement 5. An embodiment of the inventive concept includes a transaction manager (405) according to statement 1, wherein the transaction table (530) includes at least one entry, each entry including a page state, a transaction identifier (ID), a page logical address, and an entry bitmap.

Statement 6. An embodiment of the inventive concept includes a method, comprising:
receiving a request at a transaction manager for memory from a host computer;
determining if the request may be satisfied using a write data buffer in the transaction manager; and
satisfying the request using at least one of the write data buffer and the memory.

Statement 7. An embodiment of the inventive concept includes a method according to statement 6, wherein the request includes a read request requesting data.

Statement 8. An embodiment of the inventive concept includes a method according to statement 7, wherein:
determining if the request may be satisfied using a write data buffer in the transaction memory includes determining if the data requested in the read request may be found in the write data buffer; and
satisfying the request using at least one of the write data buffer and the memory includes, if the data requested in the read request may be found in the write data buffer:
reading the data requested in the read request from the write data buffer; and
sending the data requested in the read request to the host computer.

Statement 9. An embodiment of the inventive concept includes a method according to statement 8, wherein satisfying the request using at least one of the write data buffer and the memory further includes, if the data requested in the read request may not be found in the write data buffer:
placing the read request in a priority queue in the transaction manager for the memory;
receiving the data requested in the read request from the memory; and
sending the data requested in the read request to the host computer.

Statement 10. An embodiment of the inventive concept includes a method according to statement 6, wherein:
the request includes a write request requesting data be written to the memory; and
satisfying the request using at least one of the write data buffer and the memory includes sending an early acknowledgement to the host computer before completing the write requests by the memory.

Statement 11. An embodiment of the inventive concept includes a method according to statement 10, wherein satisfying the request using at least one of the write data buffer and the memory includes:
determining if a transaction table in the transaction manager includes an entry associated with a Modified flag that includes an address for the data to be written to the memory; and
if the write data buffer includes the entry associated with the Modified flag that includes the address for the data to be written to the memory, merging the data to be written with a page in the write data buffer corresponding to the entry in the transaction manager associated with the
Modified flag.

Statement 12. An embodiment of the inventive concept includes a method according to statement 11, wherein satisfying the request using at least one of the write data buffer and the memory further includes, if the transaction table does not include the entry associated with the Modified flag that includes the address for the data to be written to the memory:
determining if the data to be written to the memory includes a full data write; and
if the data to be written to the memory includes a full data write:
writing the data to be written to the write data buffer;
adding a new entry to the transaction table associated with the Modified flag; and
placing the write request in a command queue in the transaction manager for the memory.

Statement 13. An embodiment of the inventive concept includes a method according to statement 12, wherein satisfying the request using at least one of the write data buffer and the memory further includes, if the transaction table does not include the entry associated with the Modified flag that includes the address for the data to be written to the memory and the data to be written to the memory does not include a full data write:
reading a full cache line from at least one of the write data buffer and the memory;
merging the data to be written with the full cache line;
adding the new entry to the transaction table associated with the Modified flag for the merged full cache line; and
placing the write request in a command queue in the transaction manager for the memory.

Statement 14. An embodiment of the inventive concept includes a method according to statement 13, wherein reading a full cache line from at least one of the write data buffer and the memory includes:
if the transaction table include the entry associated with a Forwarded flag that includes the address for the data to be written to the memory, reading the full cache line from the write data buffer; and
if the transaction table does not include the entry associated with the Forwarded flag that includes the address for the data to be written to the memory:
  placing a read request for the full cache line in a command queue in the transaction manager for the memory; and
  receiving the full cache line from the memory.

Statement 15. An embodiment of the inventive concept includes a method according to statement 6, further comprising:
receiving a notification from the memory that a write request was removed from the command queue; and
changing a Modified flag associated with an entry in a transaction table for the write request to a Forwarded flag.

Statement 16. An embodiment of the inventive concept includes a method according to statement 15, further comprising:
receiving an acknowledgement from the memory; and
changing the Forwarded flag associated with the entry in the transaction table for the write request to an Invalid flag.

Statement 17. An embodiment of the inventive concept includes a method according to statement 6, wherein the memory includes a dedupable memory.

Statement 18. An embodiment of the inventive concept includes an article, comprising a non-transitory storage medium, the non-transitory storage medium having stored thereon instructions that, when executed by a machine, result in:
receiving a request at a transaction manager for memory from a host computer;
determining if the request may be satisfied using a write data buffer in the transaction manager; and
satisfying the request using at least one of the write data buffer and the memory.

Statement 19. An embodiment of the inventive concept includes an article according to statement 18, wherein the request includes a read request requesting data.

Statement 20. An embodiment of the inventive concept includes an article according to statement 19, wherein:
determining if the request may be satisfied using a write data buffer in the transaction memory includes determining if the data requested in the read request may be found in the write data buffer; and
satisfying the request using at least one of the write data buffer and the memory includes, if the data requested in the read request may be found in the write data buffer:
  reading the data requested in the read request from the write data buffer; and
  sending the data requested in the read request to the host computer.

Statement 21. An embodiment of the inventive concept includes an article according to statement 20, wherein satisfying the request using at least one of the write data buffer and the memory further includes, if the data requested in the read request may not be found in the write data buffer:
placing the read request in a priority queue in the transaction manager for the memory;
receiving the data requested in the read request from the memory; and
sending the data requested in the read request to the host computer.

Statement 22. An embodiment of the inventive concept includes an article according to statement 18, wherein:
the request includes a write request requesting data be written to the memory; and
satisfying the request using at least one of the write data buffer and the memory includes sending an early acknowledgement to the host computer before completing the write requests by the memory.

Statement 23. An embodiment of the inventive concept includes an article according to statement 22, wherein satisfying the request using at least one of the write data buffer and the memory includes:
determining if a transaction table in the transaction manager includes an entry associated with a Modified flag that includes an address for the data to be written to the memory; and
if the write data buffer includes the entry associated with the Modified flag that includes the address for the data to be written to the memory, merging the data to be written with a page in the write data buffer corresponding to the entry in the transaction manager associated with the Modified flag.

Statement 24. An embodiment of the inventive concept includes an article according to statement 23, wherein satisfying the request using at least one of the write data buffer and the memory further includes, if the transaction table does not include the entry associated with the Modified flag that includes the address for the data to be written to the memory:
determining if the data to be written to the memory includes a full data write; and
if the data to be written to the memory includes a full data write:
  writing the data to be written to the write data buffer;
  adding a new entry to the transaction table associated with the Modified flag; and
  placing the write request in a command queue in the transaction manager for the memory.

Statement 25. An embodiment of the inventive concept includes an article according to statement 24, wherein satisfying the request using at least one of the write data buffer and the memory further includes, if the transaction table does not include the entry associated with the Modified flag that includes the address for the data to be written to the memory and the data to be written to the memory does not include a full data write:

reading a full cache line from at least one of the write data buffer and the memory;
merging the data to be written with the full cache line;
adding the new entry to the transaction table associated with the Modified flag for the merged full cache line; and
placing the write request in a command queue in the transaction manager for the memory.

Statement 26. An embodiment of the inventive concept includes an article according to statement 25, wherein reading a full cache line from at least one of the write data buffer and the memory includes:
if the transaction table include the entry associated with a Forwarded flag that includes the address for the data to be written to the memory, reading the full cache line from the write data buffer; and
if the transaction table does not include the entry associated with the Forwarded flag that includes the address for the data to be written to the memory:
placing a read request for the full cache line in a command queue in the transaction manager for the memory; and
receiving the full cache line from the memory.

Statement 27. An embodiment of the inventive concept includes an article according to statement 18, the non-transitory storage medium having stored thereon further instructions that, when executed by the machine, result in:
receiving a notification from the memory that a write request was removed from the command queue; and
changing a Modified flag associated with an entry in a transaction table for the write request to a Forwarded flag.

Statement 28. An embodiment of the inventive concept includes an article according to statement 27, the non-transitory storage medium having stored thereon further instructions that, when executed by the machine, result in:
receiving an acknowledgement from the memory; and
changing the Forwarded flag associated with the entry in the transaction table for the write request to an Invalid flag.

Statement 29. An embodiment of the inventive concept includes an article according to statement 18, wherein the memory includes a dedupable memory.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A device, comprising:
a buffer to store data for a write request to be written to memory, the buffer configured to send a feedback based at least in part on a content of the buffer to a command parser; and
the command parser configured to receive the feedback and to output a command based at least in part on the feedback,
wherein the command includes a first type,
the command parser is further configured to prioritize the command over a second command that includes a second type based on the feedback, and
wherein one of the first type and the second type is a read command and another of the first type and the second type is a write command.

2. A device according to claim 1, further comprising a second buffer to merge a partial write request with other data, the other data drawn from a set including data in the memory or data in the buffer.

3. A device according to claim 1, further comprising a data structure including at least one entry, the entry including a page state, a transaction identifier (ID), a page logical address, and an entry bitmap.

4. A device according to claim 1, wherein the feedback is based at least in part on content of a table data structure including an address associated with the data in the buffer.

5. A device according to claim 4, wherein the feedback is further based at least in part on a search of the table data structure for a second address, wherein the second address is different from the address.

6. A device according to claim 1, wherein the command parser is further configured to prioritize the command based at least in part on the feedback.

7. A device according to claim 1, further comprising a first command queue associated with the command parser and a second command queue associated with the command parser.

8. A device according to claim 1, wherein the feedback is based in part on the data for the write request in the buffer.

9. A method, comprising:
receiving a write request at a device for memory from a host computer, the write request including a data;
storing the data in a buffer, the buffer configured to send a feedback based at least in part on the data in the buffer to a command parser;
receiving the feedback at the command parser; and
outputting a command based at least in part on the feedback, including prioritizing the command over a second command based at least in part on the feedback and the command including a first type and the second command including a second type,
wherein one of the first type and the second type is a read command and another of the first type and the second type is a write command.

10. A method according to claim 9, further comprising:
receiving a second write request at the device for the memory from the host computer, the second write request including a partial data write;
determining that partial data write updates the memory;
reading a full cache line from the memory;
merging the partial data write with the full cache line to produce a merged cache line; and
writing the merged cache line to a second page in the buffer.

11. A method according to claim 10, further comprising:
placing the second write request in a queue in the device for the memory; and
adding an entry to a table indicating that the second page in the buffer is in the queue.

12. A method according to claim 10, wherein reading a full cache line from the memory includes:
sending a read request for the full cache line from the device for the memory; and
receiving the full cache line from the memory.

13. A method according to claim 9, further comprising:
determining that a buffer includes a page including a second data for a pending write request; and merging the data for the write request with the second data in the page in the buffer, including changing a portion of the page in the buffer based at least in part on the write request.

14. A method according to claim 13, further comprising sending an early acknowledgement for the write request to the host computer.

15. A method according to claim 14, further comprising:
receiving a second write request including a full data write at a second address;
writing the full data write to a second page in the buffer;
placing the second write request in a queue in the device for the memory; and
adding an entry to a table indicating that the second page in the buffer is in the queue.

16. A method according to claim 13, further comprising:
receiving a notification from the memory that the write request was removed from a queue; and
changing an entry in a table for the write request to indicate that the entry is sent to the memory.

17. A method according to claim 9, wherein outputting the command based at least in part on the feedback includes prioritizing the command based at least in part on the feedback.

18. An article, comprising a non-transitory storage medium, the non-transitory storage medium having stored thereon instructions that, when executed by a machine, result in:
receiving a write request at a device for memory from a host computer, the write request including a data;
storing the data in a buffer, the buffer configured to send a feedback based at least in part on the data in the buffer to a command parser;
receiving the feedback at the command parser; and
outputting a command based at least in part on the feedback, including prioritizing the command over a second command based at least in part on the feedback and the command including a first type and the second command including a second type,
wherein one of the first type and the second type is a read command and another of the first type and the second type is a write command.

19. An article according to claim 18, wherein outputting the command based at least in part on the feedback includes prioritizing the command based at least in part on the feedback.

* * * * *